H. T. SEBURN.
GRAIN SAVING DEVICE FOR THRESHING MACHINES.
APPLICATION FILED NOV. 8, 1916.

1,246,949.

Patented Nov. 20, 1917.

Fig. 1.

Fig. 2.

INVENTOR
Harvey T. Seburn,
BY James A. Walsh,
ATTORNEY.

UNITED STATES PATENT OFFICE.

HARVEY T. SEBURN, OF INDIANAPOLIS, INDIANA, ASSIGNOR TO THE INDIANA MANUFACTURING COMPANY, OF INDIANAPOLIS, INDIANA, A CORPORATION OF WEST VIRGINIA.

GRAIN-SAVING DEVICE FOR THRESHING-MACHINES.

1,246,949.   Specification of Letters Patent.   Patented Nov. 20, 1917.

Application filed November 8, 1916. Serial No. 130,111.

*To all whom it may concern:*

Be it known that I, HARVEY T. SEBURN, a citizen of the United States, residing at Indianapolis, in the county of Marion and State of Indiana, have invented certain new and useful Improvements in Grain-Saving Devices for Threshing-Machines, of which the following is a specification.

My invention relates to improvements in grain saving devices for threshing machines of the character described in Letters Patent No. 1,175,019, issued March 14, 1916, the object being to retard the progress of the straw which enters the rear portion of the fan drum or casing so that loose grain carried thereby will be deflected toward and trapped by the grain saving device.

In the accompanying drawing, forming a part hereof, Figure 1 is a side elevation of a fan for pneumatic stackers of the type commonly employed in connection with such grain saving devices, and Fig. 2 is a detail sectional view on the dotted line 2—2 in Fig. 1.

In said drawing the portions marked 5 indicate the fan casing, 6 the fan therein, 7 the ejecting boot forming part of such fan structure, 8 the grain trap, 9 an auxiliary blast pipe leading from said fan casing and discharging across said trap, and 10 is a conveyer for returning saved grain to the threshing machine. All of these parts are in extensive use and well known, and therefore will be only referred to herein incidentally in describing my invention.

As will be readily understood, the material discharging from a threshing machine enters a receiving and conveying receptacle, or stacker hopper, which communicates with the eye of the stacker fan for delivering such material thereinto. At the rear wall of the hopper, 11, under certain conditions of the grain and straw, the influence of the suction from the fan 6 is greater at that point than at others, with the result that dry straw will be drawn into the fan very rapidly, and not pass directly over the grain trap as ordinarily. Under such circumstances loose grain and unthreshed heads are carried into the fan with the straw at the point indicated, and discharged into the straw stack. In order to regulate the flow of the straw mass at this point I provide the adjustable deflector, 12, which is pivotally mounted, at 13, to the fan casing, preferably at the point where the hopper 11 is attached thereto. This deflector is controlled preferably by a notched arm, 15, fitting in a catch, 16, or in any other suitable manner, so that said deflector may be raised and lowered through the slot, 17, by an attendant, from the rear side of the machine. When straw is passing into the fan at this point the deflector is shifted upwardly to the required extent to retard the flow of the straw and to divert it into the fan eye over the grain trap 8, or decrease its movement into the casing, with the result that grain falling therefrom will be thrown downwardly toward the trap and be caught therein and saved by being conveyed through the conveyer 10 into the threshing machine to be recleaned and saved. When the straw mass is normally passing over the grain trap the deflector 12 may be withdrawn from the fan eye by manipulating the arm, 15, and by which it may be adjusted to any position desired, as indicated by full and dotted lines in Fig. 1.

I claim as my invention:

In a grain saving device for threshing machines, a fan casing, a fan therein, a material receiving and conveying hopper communicating therewith, a grain trap interposed between said receptacle and fan casing, and an adjustable deflector associated with said casing for intercepting and deflecting material passing thereinto.

In testimony whereof I affix my signature in presence of two witnesses.

HARVEY T. SEBURN.

Witnesses:
J. A. WALSH,
L. A. HARDIN.

Copies of this patent may be obtained for five cents each, by addressing the "Commissioner of Patents, Washington, D. C."